Dec. 4, 1962  R. J. KOPF ET AL  3,066,303
FASTENER ARRESTING DEVICE FOR A POWER ACTUATED TOOL
Original Filed Jan. 12, 1955  3 Sheets-Sheet 1

INVENTORS
Rowland J. Kopf
Roger Marsh
BY

John D. Wilkins
ATTORNEY

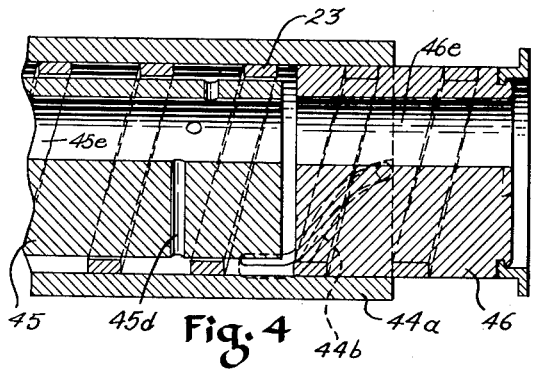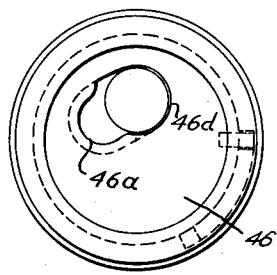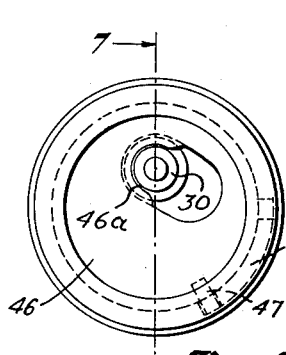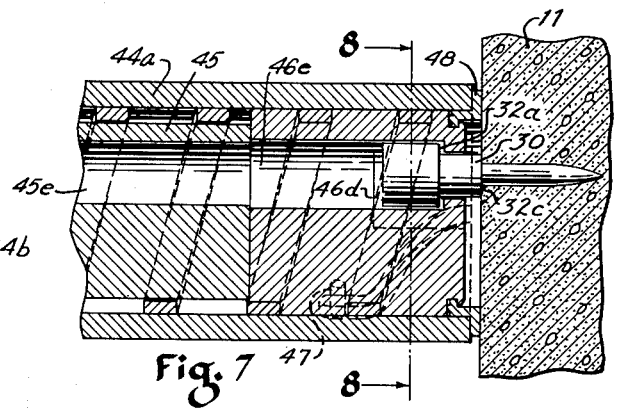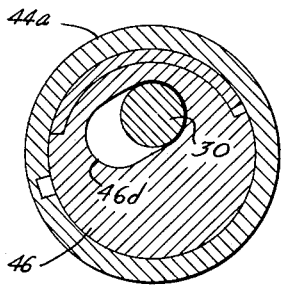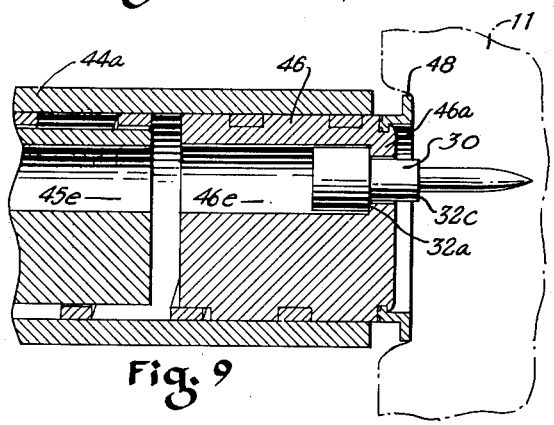

Dec. 4, 1962    R. J. KOPF ET AL    3,066,303
FASTENER ARRESTING DEVICE FOR A POWER ACTUATED TOOL
Original Filed Jan. 12, 1955    3 Sheets-Sheet 3
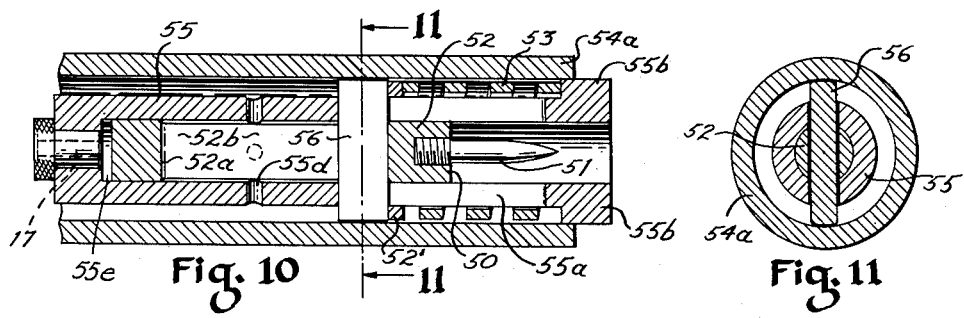
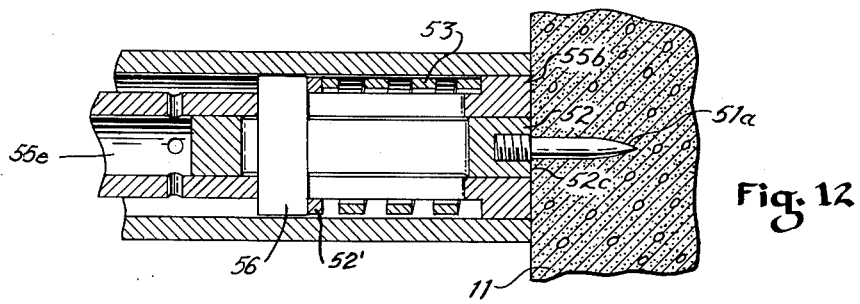
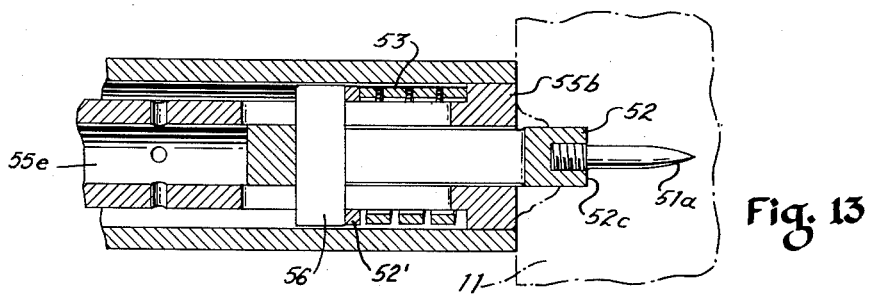
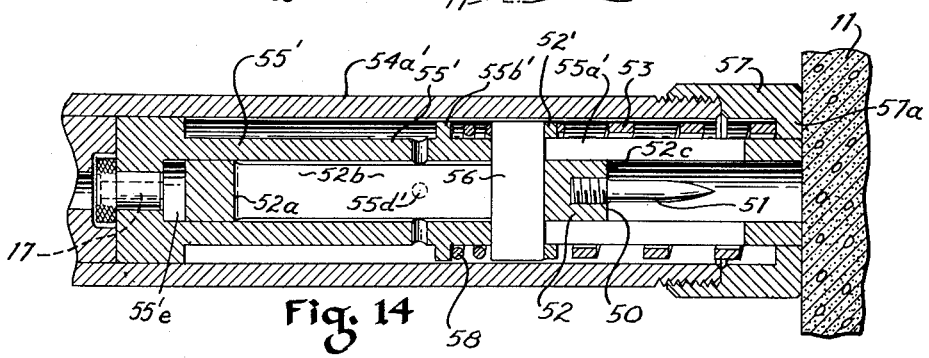
INVENTORS
Rowland J. Kopf
Roger Marsh
BY
John D. Williams
ATTORNEY

United States Patent Office 3,066,303
Patented Dec. 4, 1962

3,066,303
FASTENER ARRESTING DEVICE FOR A POWER ACTUATED TOOL
Rowland J. Kopf, Rocky River, and Roger Marsh, Hudson, Ohio, assignors by mesne assignments to Olin Mathieson Chemical Corporation, a corporation of Virginia
Original application Jan. 12, 1955, Ser. No. 481,388, now Patent No. 3,019,440, dated Feb. 6, 1962. Divided and this application Oct. 31, 1961, Ser. No. 158,626
4 Claims. (Cl. 1—44.5)

This invention relates to improvements in power actuated tools and more particularly to a power actuated tool having a captive driveable unit. This application is a division of copending patent application Serial No. 481,388, filed January 12, 1955, now Patent No. 3,019,-440, issued February 6, 1962.

One of the objects of the present invention is to provide a power actuated tool wherein a fastener driven thereby cannot escape into free flight.

A further object of the present invention is to provide a power actuated tool for driving a fastener into a workpiece wherein the fastener is a captive within the tool while it is being driven but in which means are provided for detachment from the tool of at least the piercing portion after driving thereof with the fastener remaining firmly embedded in the workpiece.

A further object of the present invention is to provide a power actuated tool for driving the piercing portion of a fastener into a workpiece wherein said tool includes an abutment means having energy absorbing means to absorb the energy of the driven fastener and to prevent overdriving of said fastener.

A further object of the present invention is to provide a power actuated tool for driving a fastener into a workpiece with said tool preventing the escape of the driven fastener into free flight, preventing overdriving of a driven fastener into soft or relatively less resistant materials, limiting free movement of a driven fastener if it is deformed upon contact with the workpiece, and minimizing likelihood of injury to personnel using or observering the tool without using expendable parts in the tool or parts vulnerable to damage if the tool is mishandled.

A further object of the present invention is to provide a power actuated tool with a resiliently loaded abutment means movable to an operative position for stopping free flight of a driveable unit in the tool as said tool moves into firing position and movable to an inoperative position for releasing said drivable unit as said tool moves into an inactive position.

A further object of the present invention is to provide a power actuated tool characterized by its greater safety in operation, more satisfactory driving of fasteners thereby, structural simplicity, and ease of operation.

Other features of this invention reside in the arrangement and design of the parts for carrying out their appropriate functions.

Other objects and advantages of this invention will be apparent from the accompanying drawings and description and the essential features will be set forth in the appended claims.

In the drawings,

FIG. 4 is a longitudinal sectional view of a second form of catcher block and explosively-actuated tool;

FIG. 5 is an end view of the tool in FIG. 4 looking toward the left at the right end thereof with the catcher block in the driveable unit releasing or its inoperative position;

FIG. 6 is an end view, similar to FIG. 5, but with catcher block in the driveable unit capturing or its operative position;

FIG. 7 is a longitudinal sectional view taken along the line 7—7 in FIG. 6 with the tool pressed against the workpiece in firing position and the driveable unit driven to its normal penetration depth;

FIG. 8 is a transverse sectional view taken along the line 8—8 of FIG. 7;

FIG. 9 is a longitudinal sectional view, similar to FIG. 7, but with dotted lines omitted for clarity and wherein the operator has attempted to fire the driveable unit into material having insufficient resistance to penetration and the tool prevents free flight thereof;

FIG. 10 is a longitudinal sectional view of a third form of fastener arresting device adapted to be used on a tool of the type shown in FIG. 1 with the tool in the loaded position;

FIG. 11 is a transverse sectional view taken along the line 11—11 in FIG. 10;

FIG. 12 is a longitudinal sectional view similar to FIG. 10 with the fastener driven to its normal depth of penetration;

FIG. 13 is a longitudinal sectional view similar to FIG. 12 with the fastener driven into material having insufficient resistance to penetration; while FIG. 14 is a longitudinal sectional view similar to FIG. 10 but of a fourth form of fastener arresting device adapted to be used on a tool of the type shown in FIG. 1.

Before the tool here illustrated is specifically described, it is to be understood that the invention here involved is not limited to the structural details or arrangement of parts here shown since tools embodying the present invention may take various forms. It also is to be understood that the phraseology or terminology herein employed is for purposes of description and not of limitation since the scope of the present invention is denoted by the appended claims.

Those familiar with this art will recognize that this invention may be applied in many ways. The invention, in its broader aspects, includes all types of power actuated tools with power actuation for such fastener driving tools including hydraulic, pneumatic, electromagnetic, explosive powder charge, or any other suitable type power. However, only the explosively actuated tool embodiment is described in detail herein. Tool 10 in FIG. 1, for example, is adapted to drive or set a fastener into the flat surface of a workpiece 11.

Figure 1:
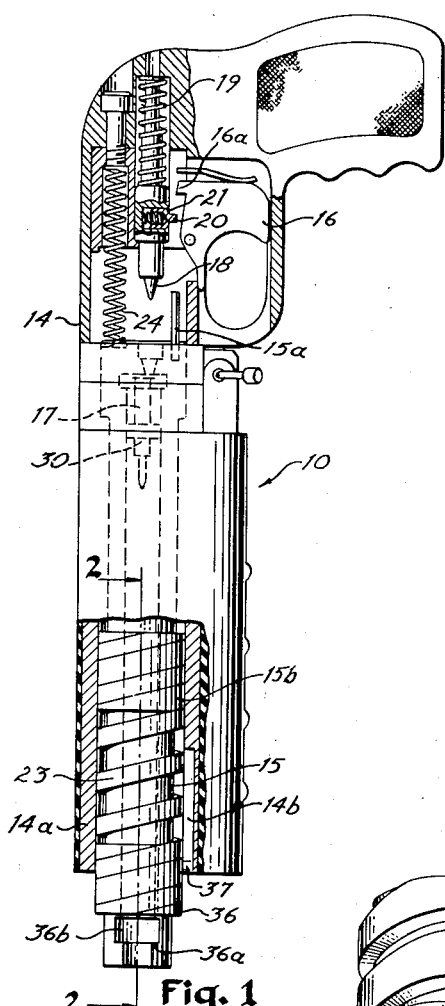
FIG. 1 is a side elevational view of an explosive type power-actuated tool, partially in section, with a spring mounted catcher block mounted on the barrel muzzle thereof and with the tool shown in the firing pin uncocked position.

Explosively-actuated tool 10 in FIG. 1 includes a member with a passageway for confining and driving, such as the bore 15e of barrel 15, so that an explosive charge set off by trigger 16 can drive a driveable unit through the barrel or along any suitable passageway from the breech or entry end toward the barrel muzzle or discharge end and into workpiece 11. An example of an explosively-actuated tool on which the present invention may be used is disclosed in the copending U.S. patent application entitled "Explosively-Actuated Tools," Serial No. 355,034, filed on May 14, 1953 by R. J. Kopf, R. W. Henning and R. Marsh, now U.S. Patent No. 2,945,236 granted July 19, 1960.

In the aforementioned copending application entitled "Explosively Actuated Tools" to which reference may be had for further disclosure if necessary, tool 10 in FIG. 1 has the flash shield and its sleeve in said copending application eliminated but includes a housing 14 with a sleeve portion 14a telescopically connected over barrel 15 with said sleeve and barrel being mounted for axial relative movement but keyed against relative rotative movement in the manner disclosed in said copending application, for example. Housing 14 has a firing means therein including a firing pin 18, biased forwardly toward the barrel muzzle into an uncocked position by compression spring 19, movable endwise in said housing between a rearward, cocked or active position and a forward, uncocked or inactive position for respectively being capable or incapable of setting off the explosive charge in cartridge case 17. When the barrel muzzle on tool 10 is pressed axially against workpiece 11, sleeve 14a telescopes forwardly from the FIG. 1 uncocked position to the FIG. 2 cocked position. In the movement to such position, a pin 15a carried by the barrel is engaged by a laterally projecting firing pin pawl 20 on firing pin 18 to cock said firing pin against the bias of spring 19. Trigger 16, pivotally mounted on housing 14, has a sear 16a for depressing firing pin pawl 20 against the bias of its spring 21 to release it from pin 15a. This serves as a means for manually releasing firing pin 18 in cocked position so that its spring 19 can force it forwardly to set off the charge in cartridge 17. When tool 10 is removed from workpiece 11, spring 24 between housing 14 and barrel 15 serves as a means for normally biasing apart barrel 15 and housing 14 into the uncocked safety position shown in FIG. 1.

In a conventional explosively actuated tool, the fastener is driven through the barrel and out of the muzzle at high speed, so that if the tool barrel is not properly set against the workpiece or if the fastener is fired into unsuitable material, the fastener may escape into the air in free flight so as to become a dangerous projectile. It is therefore desirable for safety reasons to prevent the escape of the fastener into free flight. This difficulty may occur when using a conventional tool if the operator attempts to fire the tool into the air instead of against the workpiece, if the operator attempts to fire the tool into a workpiece having insufficient penetration resistance so that the fastener travels completely through the workpiece to escape into free flight, if the operator fires the tool with the barrel axis substantially less than 90° with respect to the surface of the workpiece so that a ricochet occurs, etc. The present invention has solved these, as well as many other problems by having a driveable unit, including the fastener as well as a captive ram or fastener carrier piston, driven through the tool barrel by the explosively actuating gases with this ram prevented by appropriate means from escaping completely from the barrel. Hence, the fastener cannot escape into free flight to become a dangerous projectile.

Figure 2:
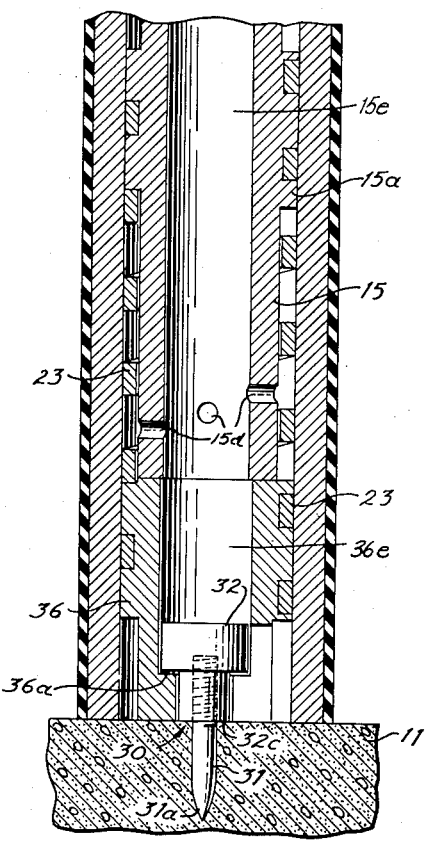
FIG. 2 is a longitudinal sectional view of the front portion of the tool in FIG. 1 pressed against the workpiece into a firing position with a driveable unit driven into a workpiece to its normal depth of penetration.
Figure 3:
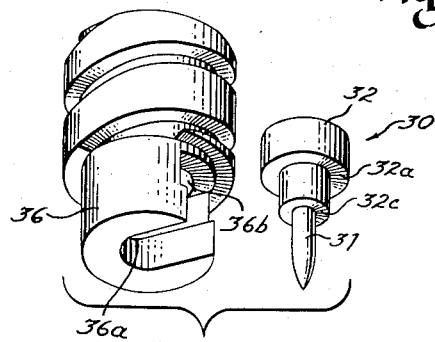
FIG. 3 is a perspective view of the catcher block in the position shown in FIG. 1 while the tool is being removed from the driven driveable unit.

In the present disclosure, the tool 10 has in FIGS. 1-3 a captive driveable unit 30 including fastener 31 detachably connected by screw threads to a fastener carrier, such as the element 32 shown here, which is designated herein as a piston, head or ram. The fastener has a forwardly projecting piercing portion 31a for penetrating the workpiece after being driven through the barrel while the piston has an abutment means or shoulder 32a to be described in further detail hereinafter. The ram or piston is shown as being internally threaded to accept the fastener, but in the event any fastener has an internally threaded head, its ram or piston may be externally threaded to engage the fastener.

The safety features of the present invention are not required under normal conditions when there is no danger of having the fastener escape into free flight. During tool loading, the piston 32 in FIGS. 1-3 is screwed onto the thread of fastener 31 so as to form the driveable unit 30 and then this unit is inserted into the breech of the tool barrel 15. It will also be apparent hereinafter that the tool could be loaded from the muzzle instead of the breech, if so desired. Then an explosive charge, such as cartridge 17 in FIGS. 1-3, is also inserted into the breech after which the breech of the tool is closed so that the tool can be moved to firing position against the workpiece 11, as shown by the tool in FIG. 2. After trigger 16 is pulled, the fastener is driven by the tool into the workpiece to its normal and desired penetration shown in FIG. 2 wherein the front shoulder 32c on the ram rather than abutment shoulder 32a normally limits the penetration thereof, when the parameters of fastener size, powder load and workpiece resistance are not quite sufficient to do it alone.

The driveable unit may be held in the barrel bore close to the cartridge 17 in any suitable manner if necessary before the tool is fired so as to control the size of the initial explosive charge chamber and to properly drive the fastener. This may take the form of friction between barrel 10 and piston 32 or other suitable retaining means, and this is especially desirable when the barrel is pointed downwardly, as in FIG. 2, so as to hold the fastener carrier piston against axial downward movement under only the weight of the driveable unit.

However, if the tool is red so that there is a possibility of having the fastener escape into free flight to become a dangerous projectile, the safety feature prevents this normal occurrence by engagement between suitable abutment means when the driveable unit in any of these tools attempts to travel outwardly through the barrel substantially beyond the FIG. 2 position. The tool barrel has a bore 15e of uniform diameter throughout most of its length of a size to permit free passage of the driveable unit therethrough with no excess clearance. However, means is provided to arrest the forward travel of the piston or ram while permitting free passage of the piercing portion of the fastener for workpiece penetration. This means includes an abutment means on the tool capable of coacting with the abutment means 32a on the piston or ram to prevent further axial travel of the driveable unit through the barrel and thus to prevent the free escape of the driveable unit from the tool. Hence, the driveable unit is stopped as its piercing portion 31a emerges a predetermined distance beyond the barrel muzzle so as to control the penetration of the workpiece or travel beyond the muzzle independently of the resistance to penetration of the workpiece material or of the explosive driving force.

This abutment means and its operative connection to the tool may take various forms. In FIGS. 1-3, block 36 is mounted over the barrel muzzle and has a barrel bore continuation 36e with an integral, inwardly directed flange 36a, adapted to engage the piston shoulder 32a to prevent overtravel of unit 30. Helical extension spring 23 is telescoped over the barrel and screwed into helical grooves in block 36 and into grooves formed in an outwardly extending flange 15b. A pin 37 in FIG. 1 carried by block 36 normally travels in longitudinal groove 14b in the bore of sleeve 14a when the tool is moved from the FIG. 1 to FIG. 2 positions. This connection prevents axial movement of the tool to the FIG. 2 firing position unless block 36 is screwed onto spring 23 until pin 37 and slot 14b register to assure proper mounting of block 36 on barrel 15 and assure constant barrel length for accurate angle fire control, as discussed hereinafter relative to the tool in FIGS. 4-9.

This construction provides greater safety in tool operation as well as more satisfactory setting of the fasteners. It prevents the free escape of a fastener. The tool operator cannot dangerously fire the fastener into free flight, as a dangerous projectile, by firing the tool into the air instead of against the workpiece. If the workpiece does not have sufficient resistance to penetration, there exists neither the danger that the fastener will emerge from the other side of the workpiece as a projectile in free flight nor the danger that the fastener will be overdriven beyond the depth control established by the engagement of the abutment shoulder 32a on the driveable unit and flange 36a at the barrel muzzle. Substantial inclination of the barrel bore from the normal to the workpiece surface will not cause a ricochet since the tool preferably has said angle fire control at excessive inclination and, in any event, the fastener cannot escape into free flight.

When the fastener is driven either to the normal penetration position of FIG. 2 or is driven beyond this point until the abutments formed by members 32a and 36a engage, the driveable unit 30 in FIGS. 1–3 can be removed from the bore extension 36e of the tool while the fastener remains embedded in the workpiece.

As shown in FIG. 2, the axial thickness of flange 36a of block 36 is somewhat less than the axial spacing of faces 32a and 32c of the piston or ram 32 shown separately in FIG. 3. In FIGS. 1–3, both the fastener 31 and the fastener carrier piston or captive ram 32 are easily disengaged as a unit from the tool after firing. In FIGS. 1–3, a transverse opening or side port 36b, in the barrel block 36 leads laterally from the barrel bore extension 36e immediately above the shelf formed by the flange 36a to the outside of the barrel. This side port serves as a means for detaching the tool from the driven driveable unit after the driveable unit has stopped traveling through the barrel bore and the parts have returned to the position shown in FIG. 1 by the operator releasing the pressure on the housing, thus permitting spring 24 to cause the barrel and the housing to occupy an extended position. When the driveable unit has been driven sufficiently far so that the abutment means engage, the captive ram or piston 32 is laterally aligned with the port so that the tool is easily removed by laterally withdrawing the tool therefrom. Sleeve 14a in FIG. 1 serves as a means for covering port 36b in the firing position of FIG. 2 to protect the operator and for uncovering port 36b for driveable unit removal in the inactive position of FIG. 1 off workpiece 11 responsive to tool movement between these positions.

When block 36 is not assembled on the tool, it should be noted that spring 23 in FIG. 2 does not extend far enough forward so that it can be used to move the tool into firing position. Hence, the tool cannot be fired in unsafe condition without block 36.

Gas ports 15d in FIG. 2 are preferably provided in the tool barrel to permit gas escape from behind piston 32 before unit 30 reaches the FIG. 2 position so as not only to reduce the likelihood of high and dangerous pressures developing in the tool barrel but also to minimize tool lift off the workpiece caused by the expanding pressure of the gas acting against spring 23 in the barrel bore tending to move the tool if the unit 30 stops before the abutment means engage.

The tool in FIGS. 4 to 9 will be next described. Captive driveable unit 30 therein has the same structure and mode of operation as unit 30 in FIGS. 1–3. The unit and cartridge 17 may be loaded into the tool and the unit held in the barrel bore close to cartridge 17 in any suitable manner, such as mentioned for the FIGS. 1–3 tool form. An abutment means on the tool coacts with the abutment means 32a on the piston or ram as the unit attempts to travel substantially beyond the FIG. 7 position in the same manner as when unit 30 attempts to travel beyond the FIG. 2 position.

The abutment means and its operative connection to the tool takes another form in FIGS. 4–9. Block 46 (corresponding to block 36 in FIG. 1) is mounted over the barrel muzzle with an integral, inwardly directed flange 46a, adapted to engage piston shoulder 32a to prevent overtravel of unit 30. Helical extension spring 23 is telescoped over the barrel and screwed into helical grooves in block 46 and into grooves formed in an extending flange on the tool barrel (similar to flange 15a in FIG. 1 but not shown).

Spring 23 operatively connects block 46 to a modified form of barrel 45 for rotation of said block about an axis parallel to the axis of the off-center bore in barrel 45. A modified form of sleeve 44a has a continuous slot or groove 44b in the bore thereof and at least partially helical in form for receiving a projecting pin 47 on block 46 to form a helical cam connection for rotating block 46 on barrel 45 in response to axial movement of sleeve 44a. Block 46 has circumferentially spaced apart thereon about its axis of rotation in FIGS. 5 and 6 one cut-out having its edge forming the abutment means on the tool by flange 46a and a second cut-out 46d larger than the barrel bore with each registrable with the barrel bore in different positions of rotation. Hence, flange 46a is operatively mounted on the barrel for movement into either an operative position (FIG. 6 or 7) in alignment with the barrel bore so as to be in the path of travel of the driveable unit 30 and its abutment surface 32a thereon to be effective for stopping said unit or an inoperative position (FIG. 4 or 5) out of said path and out of alignment with the barrel bore to permit removal of unit 30 therefrom after the fastener has been driven. Movement of the tool sleeve axially over the barrel causes flange 46a of block 46 through ring 48 to move between said positions by the operative connection therebetween. In FIGS. 4–5, forward movement of sleeve 44a rotates block 46 from the inoperative position in FIGS. 4 and 5 to the operative position in FIGS. 6 and 7. Bearing ring 48 is rotatably mounted on the end of block 46 to permit relative rotation between workpiece 11 and block 46 when they are pressed together. In the operative position, workpiece 11 backs up the abutment means on the tool to help absorb the energy of the driveable unit 30. Hence, movement of the sleeve relative to the barrel between FIGS. 4 and 7 positions, for example, causes not only movement of the abutment flange 46a on the block 46 between inoperative and operative positions but also causes movement of firing pin 18 between uncocked and cocked positions. As the tool barrel muzzle is pressed against the workpiece, the relative movement moves firing pin 18 to cocked position and moves the abutment means on the tool to the FIG. 7 operative position. After trigger 16 has been pulled to release firing pin 18 to firing position and driveable unit 30 is driven to the FIG. 7 position or if the operator desires to return the tool to the safety position with firing pin 18 uncocked in the FIG. 1 position, he merely withdraws the tool axially from workpiece 11. The relative movement moves the abutment means on the tool to the FIG. 4 inoperative position and moves the firing pin 18 to the FIG. 1 uncocked, safety position. Hence, the automatic operation of this invention cooperates perfectly with the operation of the tool disclosed in said copending application and providing response to thrust against the workpiece and said angle fire control.

In FIGS. 4 and 7, groove 44b in sleeve 44a is of continuous form but has a helical portion and a longitudinal portion. The helical portion rotates block 46 in response to axial movement of sleeve 44a on barrel 45. The longitudinal portion permits relative axial movement of sleeve 44a on barrel 45 without further rotating block 46 so that the tool may be fired in the same manner as the tool disclosed in said copending application without difficulty. The barrel length from bearing ring 48 to cocking pin 15a is constant as firing pin 18 approaches the cocked position so that firing pin pawl 20 wil always align in the same manner with trigger sear 16a for proper firing. Also, when the tool barrel axis is tilted from the perpendicular to the workpiece surface, the angle fire or tilt control described in said copending application still prevents firing of said tool because trigger sear 16a and pawl 20 do not align at approximately the same tilt since this barrel length remains constant over the range of permissible tilt.

When block 46 is not assembled on the tool, it should be noted that spring 23 in FIG. 7 does not extend far enough forward so that it can be used to move the tool into firing position. Hence, the tool cannot be fired in unsafe condition without block 46.

Spring 23 provides a form of lost motion connection in the embodiments of FIGS. 1-9 since it with the block and piston serves as resilient energy absorbing means for absorbing the energy of the explosive charge during stopping of piston 32 by permitting the axial movement of separate block 36 of FIGS. 1-3 and of block 46 from FIG. 7 to FIG. 9 relative to its associated barrel wherever there is danger that the fasteners will escape into free flight, such as when the tool operator attempts to fire it into material having insufficient resistance to penetration. Normally abutment shoulder 32a is spaced from 36a (FIG. 2) and from flange 46a (FIG. 7). Compare, for example, FIG. 7 showing normal penetration depth with respectively FIG. 9. It should be apparent that after reaching full stretch spring 23 integrates the block and barrel and will also provide the same function for block 36 in FIG. 2 and block 46 in FIG. 7.

When the fastener is driven either to the normal penetration position of FIG. 7 or is driven beyond this point until the abutments formed by members 32a and 46a engage, the drivable unit 30 in FIGS. 4-9 can be removed from the bore 45e of the tool while the fastener remains embedded in the workpiece.

In FIGS. 4-9, both the fastener 31 and the fastener carrier piston or captive ram 32 are easily disengaged as a unit from the tool after firing. The tool is removed axially from the driven unit after block 46 is rotated to the inactive position in FIGS. 4 and 5. Then, the piston 32 in FIGS. 4-9 may be unscrewed for reuse and the fastener 31 remains driven in workpiece 11.

Gas ports 45d are also preferably provided in FIG. 4 in the tool barrel to permit gas escape from behind piston 32 before unit 30 reaches the FIG. 7 position so as to provide the advantages mentioned for ports 15d.

It will also be apparent as the description proceeds, that the tool in FIGS. 1-9 will work in basically the same manner if the fastener can be designed with an outline having the shape of the whole drivable unit so that the unit is one integral member with the ram or piston portion being integrally a part of the driven fastener so that a separate ram or piston is not required.

In the present disclosure, the tool 10 has in FIGS. 10-13 a captive drivable unit 50 including fastener 51 detachably connected by screw threads to a fastener carrier, such as the element 52 here shown, which is designated herein as a piston, head or ram. The fastener has a forwardly projecting piercing portion 51a for penetrating the workpiece after being driven through the barrel while the piston has an abutment means or shoulder 52a (the left end of slot 52b in FIGS. 10-13) to be described in further detail hereinafter. The ram or piston is shown as being internally threaded to accept the fasteners, but in the event any fastener has an internally threaded head, its ram or piston may be externally threaded to engage the fastener.

The safety features of the present invention are not required under normal conditions when there is no danger of having the fastener escape into free flight. During loading of the tool in FIGS. 10-13, the fastener 51 is screwed into the ram or piston in approximately the FIG. 12 position, and then drivable unit 50 is pushed rearwardly through the barrel 55 to about the FIG. 10 position in the barrel bore 55e until it is close to the seated position of cartridge 17 and is held in this position in any suitable manner, as mentioned for the FIGS. 1-3 tool form. Then, an explosive charge, such as cartridge 17 in FIGS. 10-13, is also inserted into the breech after which the breech of the tool is closed so that the tool can be moved to firing position against the workpiece 11, as shown by the tool in FIG. 14. After trigger 16 is pulled, the fastener is driven by the tool into the workpiece to its normal and desired penetration shown in FIG. 12 wherein the shoulder 52c on the ram normally limits the penetration thereof.

In FIGS. 10-13, the abutment means and its operative connection to the tool takes another form. A crossbar 56 extends transversely through slots or elongated apertures 55a in a modified form of barrel 55 and an elongated aperture or slot 52b in piston 52, elongated in the direction of the barrel axis to form a lost motion connection between piston 52 and its associated barrel 55. A helical compression spring 53 and ring 52' are telescoped over each barrel to be located between and to operatively connect crossbar 56 and its associated barrel by an outwardly extending integral flange 55b on barrel 55 in FIGS. 10-13.

Spring 53 also serves as resilient energy absorbing means for absorbing the energy of the explosive charge during stopping of piston 52 by permitting axial movement of crossbar 56 from FIG. 12 to FIG. 13 relative to its associated barrel wherever there is danger that the fastener will escape into free flight, such as when the tool operator attempts to fire it into material having insufficient resistance to penetration. Compare, for example, FIG. 12, showing normal penetration depth, with FIG. 13.

This construction provides greater safety in tool operation as well as more satisfactory setting of the fasteners. It prevents the free escape of a fastener. The tool operator cannot dangerously fire the fastener into free flight, as a dangerous projectile, by firing the tool into the air instead of against the workpiece. If the workpiece does not have sufficient resistance to penetration, there exists neither the danger that the fastener will emerge from the other side of the workpiece as a projectile in free flight nor the danger that the fastener will be overdriven beyond the depth control established by the engagement of the abutment shoulder 52a on the drivable unit and crossbar 56 on the tool at the barrel muzzle. Substantial inclination of the barrel bore from the normal to the workpiece surface will not cause a ricochet since the tool preferably has said angle fire control and, in any event, the fastener cannot escape into free flight.

When the fastener is driven either to the normal penetration position of FIG. 12 or is driven beyond this point until the abutments formed by members 52a and 56 engage, the fastener 51 in FIGS. 10-13 can be removed from the bore of the tool while the fastener remains embedded in the workpiece.

In FIG. 13, the fastener 51 is easily disengaged from the tool after firing by spinning off or unscrewing the whole tool from the driven fastener 51 so that the tool may be pulled axially therefrom.

Gas ports 55d are also preferably provided in FIG. 10 in the tool barrel to permit gas escape from behind piston 52 before unit 50 reaches the FIG. 12 position so as to provide the advantages mentioned for ports 15d.

The tool in FIG. 14 will be next described. Captive drivable unit 50 therein has the same structure and mode of operation as unit 50 in FIGS. 10-13. The unit and cartridge 17 may be loaded into the tool and the unit may be pushed rearwardly in the barrel and held in the barrel bore close to cartridge 17 in any suitable manner, such as mentioned for the FIGS. 10-13 tool form. An abutment means on the tool coacts with the abutment means 52a on the piston or ram as the unit attempts to travel substantially beyond the FIG. 12 position in the same manner as when unit 50 attempts to travel substantially beyond the FIG. 12 position.

In FIG. 14, the abutment means and its operative connection to the tool takes a form similar to that in FIGS. 10-13. Crossbar 56 extends transversely through slots or elongated apertures 55a' in the modified form of barrel 55' and an elongated aperture of slot 52b in piston 52, elongated in the direction of the barrel axis to form a lost motion connection between piston 52 and its associated barrel 55'. A helical compression spring 53 and ring 52' are telescoped over the barrel to be located between and to operatively connect crossbar 56 and its associated barrel by an inwardly extending flange 57a on a cap 57 screwed onto sleeve 54a' in FIG. 14. Sleeve 54a' surrounds barrel 55' and is generally fixed against axial movement relative to the barrel in the firing position shown in FIG. 14 by having both the barrel muzzle and cap 57 pressed against workpiece 11, but in any event even when not so pressed, the sleeve 54a' as in the other embodiments is operatively connected to the barrel through other tool parts shown in FIG. 1 and the aforenoted patent.

Spring 53 in FIG. 14 also absorbs the energy of the explosive charge during stopping in the same manner as spring 53 in FIG. 13.

FIG. 14 also includes resilient means for absorbing the rebound energy of crossbar 56 and spring 53 after the drivable unit has reached a position comparable to FIG. 13. If the tool is fired into the air or into easily penetrated material, compressed spring 53 in FIG. 13 may cause, upon release of its energy, the cross bar 56 to strike the rear end of slots 55a' with considerable force. Helical spring 58 is located between and operatively connects crossbar 56 and flange 55b' integral with barrel 55' to absorb this rebound energy.

When the fastener is driven either to the normal penetration position or is driven beyond this point until the abutments, formed by members 52a and 56 engage, the fastener 51 in FIG. 14 can be removed from the bore of the tool while the fastener remains embedded in the workpiece by spinning or unscrewing the whole tool from the driven fastener 51 so that the tool may be pulled axially therefrom.

Gas ports 55d' are also preferably provided in FIG. 14 in the tool barrel to permit gas escape from the barrel bore 55e' behind piston 52 before unit 50 reaches the FIG. 12 position so as to provide the advantages mentioned for ports 15d.

In all figures of the drawing, the fasteners are shown as being screwed into the piston or captive ram to the full thread depth. However, it is possible to manually adjust the position wherein the safety feature on each of the tools takes effect. The tool operator can preset this distance by adjusting the screw thread engagement between the piston and fastener when the tool is loaded.

Any of these constructions provides greater safety in tool operation as well as more satisfactory setting of the fasteners. It prevents the free escape of a fastener. The tool operator cannot dangerously fire the fastener into free flight, as a dangerous projectile, by firing the tool into the air instead of against the workpiece. If the workpiece does not have sufficient resistance to penetration, there exists neither the danger that the fastener will emerge from the other side of the workpiece as a projectile in free flight nor the danger that the fastener will be overdriven beyond the depth control established by the engagement of the abutments on the drivable unit and on the tool at the barrel muzzle. Substantial inclination of the barrel bore from the normal to the workpiece surface will not cause a ricochet since the tool preferably has said angle fire control and, in any event, the fastener cannot escape into free flight.

Various changes in details and arrangement of parts can be made by one skilled in the art without departing from either the spirit of this invention or the scope of the appended claims.

What is claimed is:

1. A power actuated tool including a member providing a passageway so that said power can drive a driveable unit through said passageway toward the discharge end thereof, said tool adapted to drive a driveable unit including a head having a first abutment means thereon and adapted to carry along said passageway a forwardly projecting piercing portion of a fastener for penetrating a workpiece after being driven along said passageway, a block operatively connected at said discharge end and including a second abutment means for operatively engaging said first abutment means to stop the travel of said unit along said passageway with the piercing portion adapted to travel a predetermined distance beyond the discharge end for workpiece penetration, and resilient energy absorbing means including a helical spring telescoped over said member and screwed onto said block and onto an outwardly extending flange on said member for absorbing the energy of the driveable unit during stopping of said head by permitting movement of said block relative to said member.

2. A power actuated tool including a member providing a passageway so that said power can drive a driveable unit through said passageway toward the discharge end thereof, said tool adapted to drive a driveable unit including a head having a first abutment means thereon and adapted to carry along said passageway a forwardly projecting piercing portion of a fastener for penetrating a workpiece after being driven along said passageway, a block operatively connected at said discharge end and including a second abutment means for operatively engaging said first abutment means to stop the travel of said unit along said passageway with the piercing portion adapted to travel a predetermined distance beyond the discharge end for workpiece penetration, and resilient energy absorbing means operatively connecting said block and said member for absorbing the energy of the driveable unit during stopping of said head by permitting movement of said block relative to said member, said block having a laterally opening port, whereby said tool may be removed from said unit by laterally withdrawing the tool therefrom.

3. A power actuated tool including a member providing a passageway so that said power can drive a driveable unit through said passageway toward the discharge end thereof, said tool adapted to drive a driveable unit including a head having a first abutment means thereon and adapted to carry along said passageway a forwardly projecting piercing portion of a fastener for penetrating a workpiece after being driven along said passageway, a block operatively connected at said discharge end and including a second abutment means for operatively engaging said first abutment means to stop the travel of said unit along said passageway with the piercing portion adapted to travel a predetermined distance beyond the discharge end for workpiece penetration, resilient energy absorbing means including a helical spring telescoped over said member and screwed onto said block and onto an integral outwardly extending flange on said member for absorbing the energy of the driveable unit during stopping of said head by permitting movement of said block relative to said member, said block having a laterally opening port, whereby said tool may be removed from said unit by laterally withdrawing the tool therefrom, a sleeve around said member, said sleeve and member being mounted for axial relative movement between tool inactive and firing position, and a pin and slot connection between said member and sleeve to prevent axial movement to said firing position unless said block is screwed into said spring until said pin and slot register to assure proper mounting of said block on said member.

4. A power actuated tool including a member providing a passageway so that said power can drive a driveable unit through said passageway toward the discharge end thereof, said tool adapted to drive a driveable unit including a head having a first abutment means thereon and adapted to carry along said passageway a forwardly projecting piercing portion of a fastener for penetrating a workpiece after being driven along said passageway, a block operatively connected at said discharge end and including a second abutment means for operatively engaging said first abutment means to stop the travel of said unit along said passageway with the piercing portion adapted to travel a predetermined distance beyond the discharge end for workpiece penetration, resilient energy absorbing means operatively connecting said block and said member for absorbing the energy of the driveable unit during stopping of said head by permitting movement of said block relative to said member, said block having a laterally opening port, and means for covering and uncovering said port responsive to tool movement respectively to firing position and inactive position, whereby said tool may be removed from said unit by laterally withdrawing the tool therefrom.

No references cited.